US012216761B2

(12) United States Patent
Kashani et al.

(10) Patent No.: US 12,216,761 B2
(45) Date of Patent: Feb. 4, 2025

(54) DYNAMIC ADAPTATION OF MEMORY ELEMENTS TO PREVENT MALICIOUS ATTACKS

(71) Applicant: Denso Corporation, Kariya (JP)

(72) Inventors: Ameer Kashani, Southfield, MI (US); Gopalakrishnan Iyer, Santa Clara, CA (US); Carlos Mora-Golding, Southfield, MI (US); Hirofumi Yamashita, Southfield, MI (US)

(73) Assignee: DENSO CORPORATION, Kariya (JP)

( * ) Notice: Subject to any disclaimer, the term of this patent is extended or adjusted under 35 U.S.C. 154(b) by 350 days.

(21) Appl. No.: 17/689,197

(22) Filed: Mar. 8, 2022

(65) Prior Publication Data

US 2023/0306110 A1  Sep. 28, 2023

(51) Int. Cl.
*G06F 21/56* (2013.01)

(52) U.S. Cl.
CPC ........ *G06F 21/56* (2013.01); *G06F 2221/034* (2013.01)

(58) Field of Classification Search
CPC .......... G06F 21/50; G06F 21/52; G06F 21/54; G06F 21/55; G06F 21/56; G06F 21/566
See application file for complete search history.

(56) References Cited

U.S. PATENT DOCUMENTS

| | | | | |
|---|---|---|---|---|
| 2011/0239283 | A1* | 9/2011 | Chern | H04L 9/3213 726/6 |
| 2013/0013965 | A1* | 1/2013 | Guillemin | G06F 21/52 714/48 |
| 2018/0060568 | A1* | 3/2018 | Galenson | G06F 21/554 |
| 2020/0074082 | A1* | 3/2020 | Tumblin | G06F 11/301 |
| 2020/0125378 | A1* | 4/2020 | Tshouva | G06F 21/51 |
| 2020/0134172 | A1* | 4/2020 | Kim | G06F 8/65 |
| 2020/0257827 | A1* | 8/2020 | Kounavis | H04L 9/0637 |
| 2020/0371945 | A1* | 11/2020 | Peles | G06F 12/0875 |
| 2021/0273795 | A1* | 9/2021 | Dahlberg | H04L 9/0894 |
| 2023/0106636 | A1* | 4/2023 | Brown | G06F 13/1668 711/105 |
| 2023/0140975 | A1* | 5/2023 | Elad | G11C 29/24 726/26 |

FOREIGN PATENT DOCUMENTS

WO  2018038955 A1  3/2018

\* cited by examiner

*Primary Examiner* — Jeremy S Duffield
(74) *Attorney, Agent, or Firm* — Christopher G. Darrow; Darrow Mustafa PC (57) ABSTRACT

Systems, methods, and other embodiments described herein relate to adaptable canary values. In one embodiment, a method includes acquiring state information about a program executing within a vehicle. The state information specifies at least a security level of segments of the program. The method includes, responsive to the program satisfying a generating threshold, generating a canary value according to the state information. The method includes inserting the canary value into a memory address associated with the program.

18 Claims, 7 Drawing Sheets

DYNAMIC ADAPTATION OF MEMORY ELEMENTS TO PREVENT MALICIOUS ATTACKS

TECHNICAL FIELD

The subject matter described herein relates in general to systems and methods for securing a program against malicious attacks and, more particularly, to using adaptable canary values within the program to selectively secure different program segments.

BACKGROUND

Threats to the integrity of a software program are numerous and evolving. For example, a program can include different vulnerabilities in relation to data flows, program flows, and so on. Malicious attackers may exploit these vulnerabilities to manipulate data and/or maliciously redirect the program. This malicious manipulation can result in unintended actions by the program, such as runtime errors, data destruction, data exposure, and so on.

As such, when a program is to provide functionality, such as controlling a vehicle or other safety-critical functions such attacks and faults can be problematic since the well-being of passengers is at stake. Accordingly, ensuring that malicious actors cannot interfere with a program or reverse engineer a program can be important to safeguard the functioning of the vehicle or other device. Programs and/or associated memory, such as stacks, heaps, etc., can include values known as "canaries" that are, in general, static known values placed within the memory. These values can be checked to verify that a malicious actor has not modified the memory and, by extension, the associated program. However, malicious entities can discover the canaries and manipulate the canaries to avoid detection.

SUMMARY

In one embodiment, example systems and methods associated with dynamically adapting memory elements to secure a program against malicious attacks are disclosed. As previously noted, programs can be susceptible to various attacks on memory, such as attempts to alter data elements, instructions/functions, and so on. Moreover, simply inserting static canary values (e.g., values with the same properties, such as length) into a stack/heap of the program can be helpful but may be thwarted by malicious attacks because of the predictable attributes of this type of canary value.

Therefore, in one embodiment, a disclosed approach includes generating canary values according to attributes of a particular segment of the program. For example, different program segments can have different sensitivities to attacks. That is, certain variables may be exposed to attack by a greater degree or associated with segments that are relatively more important (e.g., functional safety-related). Similarly, a particular function can have a higher security level due to a role in system-critical functions. Thus, in various aspects of the disclosed approaches, a security system can acquire system state information about different segments of the program, including security levels for different functions, variables, and so on. The security levels generally indicate when a segment is more vulnerable in relation to other segments. As noted, aspects of the program that relate to functional safety can be considered especially vulnerable, thereby garnering more extensive protection. The system can gather the determinations about security levels according to a risk analysis performed prior to execution (i.e., pre-analysis) of the program. Furthermore, other factors may also contribute to the system state and security level, such as a current execution state of the program, and so on.

In any case, when executing, the system determines to generate a canary value according to a location of execution in the program as identified by the system state and/or according to an interrupt that indicates a timing of when to generate the canary value. Whichever case occurs, the system determines the system state (e.g., security level) and generates the canary value with attributes that correspond to the security level. As a result, the system may generate the canary value with varying lengths where longer canary values are more secure but may be more computationally intensive to generate and also use more computing resources to subsequently check. Thus, the longer canary values are generally reserved for at-risk elements. Once generated, the system inserts the canary value by, for example, copying the program segment and inserting the canary value, which can include updating program offsets and rewriting the segment with the canary back into a particular address range of a stack/heap associated with the program.

Subsequently, the system monitors for the canary values during execution and/or at system interfaces to detect different types of attacks. The system generally compares the inserted canary values with privately retained copies to ensure there has been no modification or offloading of memory at system interfaces. In this way, the present approach improves the security of a program against malicious attack and/or attempts at reverse engineering.

In one embodiment, a security system is disclosed. The security system includes one or more processors and a memory that is communicably coupled to the one or more processors. The memory stores a control module including instructions that, when executed by the one or more processors, cause the one or more processors to, acquire state information about a program executing within a vehicle. The state information specifies at least a security level of segments of the program. The control module including instructions to, responsive to the program satisfying a generating threshold, generate a canary value according to the state information. The control module including instructions to insert the canary value into a memory address associated with the program.

In one embodiment, a non-transitory computer-readable medium is disclosed. The computer-readable medium stores instructions that, when executed by one or more processors, cause the one or more processors to perform the disclosed functions. The instructions include instructions to acquire state information about a program executing within a vehicle. The state information specifies at least a security level of segments of the program. The instructions including instructions to, responsive to the program satisfying a generating threshold, generate a canary value according to the state information. The instructions including instructions to insert the canary value into a memory address associated with the program.

In one embodiment, a method is disclosed. In one embodiment, the method includes acquiring state information about a program executing within a vehicle. The state information specifies at least a security level of segments of the program. The method includes, responsive to the program satisfying a generating threshold, generating a canary value according to the state information. The method includes inserting the canary value into a memory address associated with the program.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with dynamically adapting memory elements to secure a program against malicious attacks are disclosed. As previously noted, programs can be susceptible to various attacks on memory, such as attempts to alter data elements, and can be susceptible to attacks that redirect program flow. However, simply inserting static canary values (e.g., values with the same properties, such as length) into the program throughout may be thwarted by malicious attacks because of the predictable attributes of this type of canary value and the predictability of locations for the values. For example, inserting values of the same length into similar areas among data values can be identified through various forms of analysis and may then be thwarted as a mechanism for protecting the program. Moreover, in relation to the placement of the canary values within the program, limiting the canary values to data elements, such as program variables, etc., can further limit how effective the approach can be at thwarting attacks because functions, which may be particularly sensitive, are then left without specific protection.

Therefore, in one embodiment, a disclosed approach includes generating canary values according to attributes of a particular segment of the program to balance a level of protection for the segment with the risk associated therewith and, thus, also the amount of computing resources used to generate and verify the canary values. In various aspects of the disclosed approaches, a security system can acquire system state information about different segments of the program, including security levels for different functions, variables, and so on. As noted, aspects of the program that relate to functional safety can be considered especially vulnerable, thereby garnering more extensive protection. Thus, classifying different aspects using the security levels provides for indicating when a segment is more vulnerable in relation to other segments. The system can gather the determinations about the security levels according to a risk analysis performed prior to the execution of the program. Furthermore, other factors may also contribute to the system state and security level, such as the current execution state of the program (e.g., which section of the program is currently active), and so on.

In any case, when executing, the system generates a canary value according to a location of execution in the program, as identified by the system state and/or according to an interrupt that indicates a timing of when to generate the canary value (e.g., on a random basis throughout). Whichever case occurs, the system determines the system state (e.g., security level, currently executing segment of the program) and generates the canary value with attributes that correspond. As a result, the system may generate the canary value with varying lengths where longer canary values are more secure but may be more computationally intensive to generate and also use more computing resources to subsequently check when verifying memory integrity. Thus, the longer canary values are generally reserved for sensitive elements. Once generated, the system inserts the canary value back into the heap/stack associated with the program and updates program associated values (e.g., offsets) accordingly.

Subsequently, to enforce security associated with the canary values, the system monitors for the canary values, which can include monitoring system interfaces for the values being offloaded and/or checking the values during execution as the system executes associated segments of the program. In this way, the present approach improves the security of a program against malicious attack and/or attempts at reverse engineering.

Figure 1:
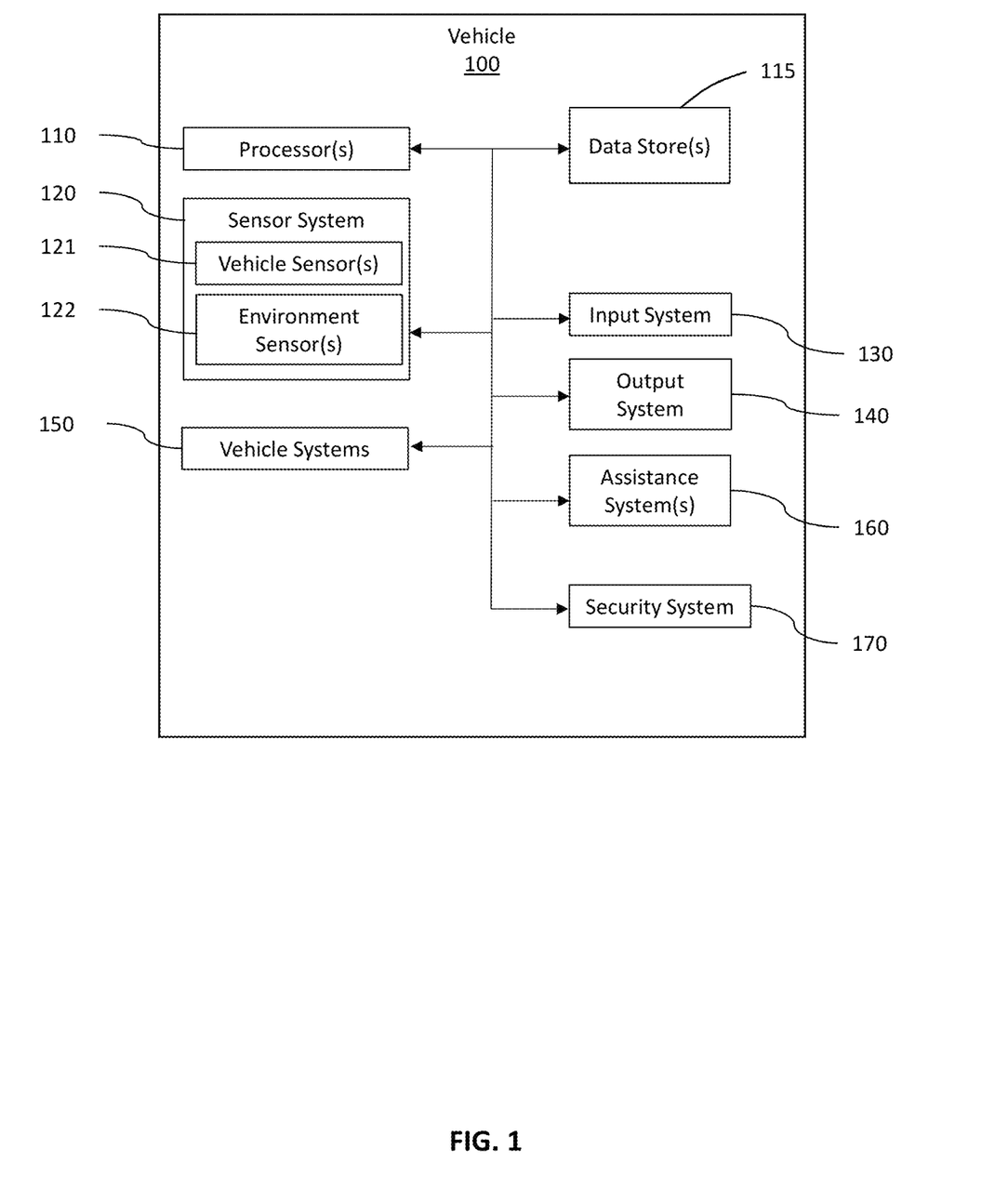
FIG. 1 illustrates one embodiment of a configuration of a vehicle in which example systems and methods disclosed herein may operate.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may instead be an electronic device associated with a transportation infrastructure (e.g., roadside unit), a cloud-based system communicating with mobile devices, or other devices that may implement a program involving functional safety of an associated device, and thus benefits from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-7 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a security system 170 that functions to improve the integrity of programs executing in association with the processor 110 against malicious attacks while also improving the robustness of the programs against reverse engineering, data loss, and/or other undesired manipulation. Moreover, while depicted as a standalone component, in one or more embodiments, the security system 170 is integrated with the assistance system 160, or another similar system of the vehicle 100 to facilitate improving the security of functions of the systems/modules associated with automated and/or user-oriented controls of the vehicle 100. The noted functions and methods will become more apparent with a further discussion of the figures.

Figure 2:
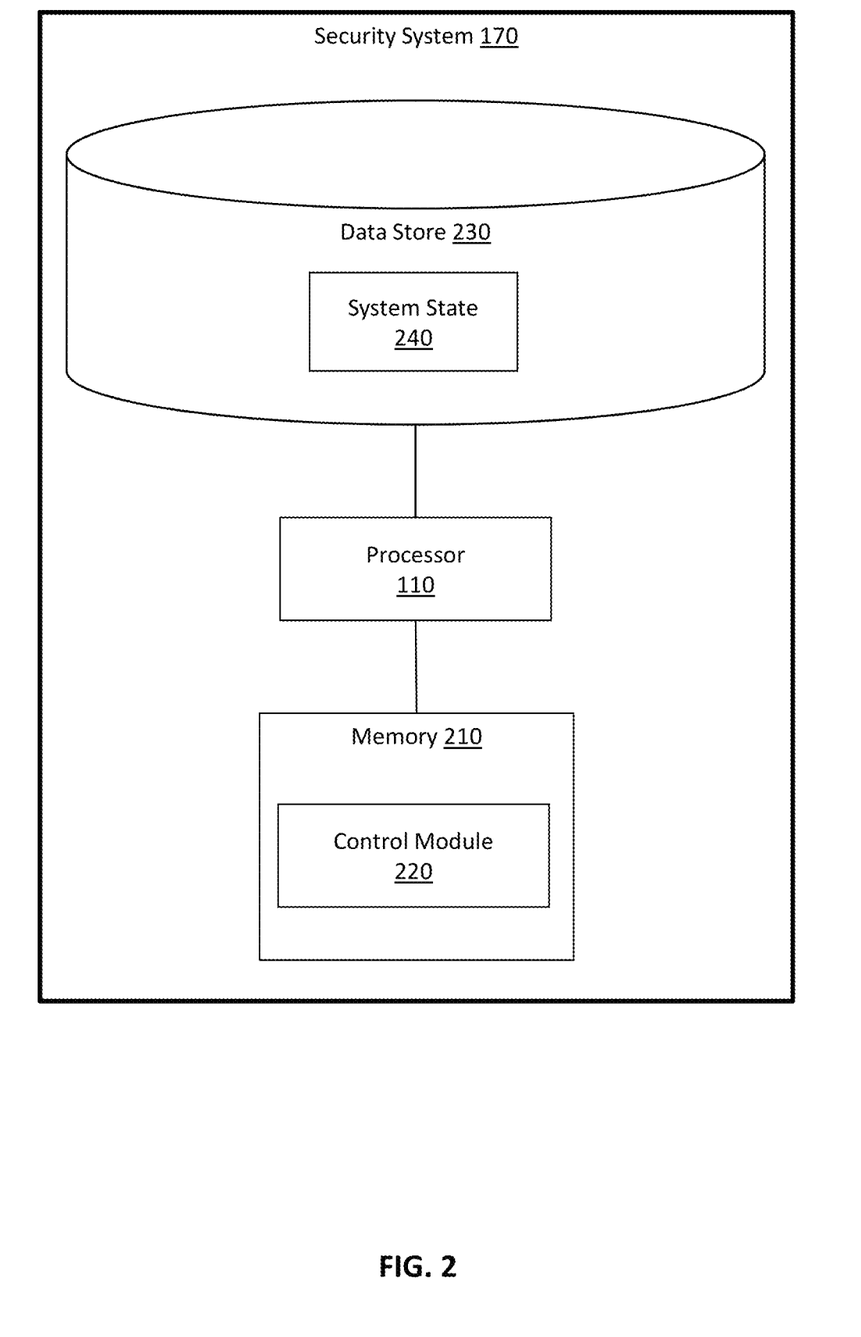
FIG. 2 illustrates one embodiment of a security system that is associated with dynamically adaptable canary values.

With reference to FIG. 2, one embodiment of the security system 170 is further illustrated. As shown, the security system 170 includes a processor 110. Accordingly, the processor 110 may be a part of the security system 170, or the security system 170 may access the processor 110 through a data bus or another communication pathway. In one or more embodiments, the processor 110 is an application-specific integrated circuit that is configured to implement functions associated with a control module 220. More generally, in one or more aspects, the processor 110 is an electronic processor, such as a microprocessor that is capable of performing various functions as described herein when executing encoded functions associated with the security system 170. Moreover, the processor 110 or another electronic processing unit associated with the security system 170 executes a program that is to be secured/protected. In various embodiments, the particular functionality of the program may vary but can include automated driving functions (e.g., ADAS functions, machine perception, mapping, object detection/identification, path planning, vehicle control routines, and so on), functions associated with control of the vehicle 100, execution of infotainment systems within the vehicle 100, and so on. Thus, various aspects of the program may be related to functional safety of the vehicle 100, sensitive/personal information, and so on, which should be protected by improved security measures. Furthermore, it should be appreciated that the program itself can be structured in different ways but is generally formed of multiple segments. The segments include data elements (e.g., variables), and various functions (i.e., blocks of code associated with performing a particular function). Accordingly, the security system 170 functions to protect the program and the separate segments as outlined further subsequently.

In one embodiment, the security system 170 includes a memory 210 that stores the control module 220 and, in various configurations, additional elements (e.g., a program). The memory 210 is a random-access memory (RAM), read-only memory (ROM), a hard disk drive, a flash memory, or other suitable memory for storing the module 220. The control module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware, such as processing components (e.g., controllers), circuits, etc. for independently performing one or more of the noted functions. Thus, the control module 220 may be embodied as instructions within the memory 210 or as a standalone component, such as a system-on-a-chip (SoC), ASIC, or another device.

Furthermore, in one embodiment, the security system 170 includes a data store 230. The data store 230 is, in one arrangement, an electronically-based data structure for storing information. For example, in one approach, the data store 230 is a database that is stored in the memory 210 or another suitable electronic storage medium (e.g., RAM, ROM, on-chip cache, etc.), and that is configured with routines that can be executed by the processor 110 for analyzing stored data, providing controlled access to stored data, organizing stored data, and so on. In any case, in one arrangement, the data store 230 stores data used by the control module 220 in executing various functions. In one embodiment, the data store 230 includes system state 240 (also referred to as state information herein) along with, for example, other information that is used by the control module 220.

Accordingly, the control module 220 generally includes instructions that function to control the processor 110 to acquire data inputs from one or more aspects of the security system 170, the vehicle 100, and/or additional sources, such as metadata, pre-configuration files, and so on that may be communicated via external sources. In general, the system state 240 includes information that facilitates securing a program from malicious attack. Thus, in one configuration, the system state 240 includes information about the security level of separate segments of the program. For example, during development, the program may undergo a functional safety analysis to identify which functions within the program are critical to the functional safety of the vehicle 100 when the program is executing. According to this analysis, the security system 170 can, for example, rank the security of different segments of the program. As one example, the security system 170 may implement a binary approach where different segments are identified with a security level that is sensitive or not. As such, the sensitive segments represent aspects of the program that are to be further protected with, for example, a canary value having a longer length, a greater number of canary values and/or canary values inserted within functional blocks (i.e., interleaved between instructions of a function). In yet further approaches, the security system 170 may implement a finer granularity of assessment for the security levels, such as a scale of 1-10 or another defined set of categories.

In any case, the system state 240 includes information that the security system 170 can use to identify the security level. Additionally, while this discussion highlights functional safety as an indicator for assessing the security level, the system state 240 may also include other information that influences the security level. For example, the system state 240 can indicate a level of exposure for different segments (e.g., which segments receive user inputs, which segments are referenced frequently in instructions executed by the processor 110, which segments handle external communications, etc.), a vehicle system associated with a particular segment or the program overall, a particular function performed by a segment (i.e., related to functional safety, related to security, related to communication, etc.), and so on.

Further still, the system state 240 also indicates real-time aspects, such as a current point in execution, a time/number of lines in the program since a canary value was last generated, a state of variables (e.g., recently modified, modified N times within the preceding X seconds, etc.), and so on. In this way, the security system 170 can gather information that informs how to best protect the program.

Figure 3:
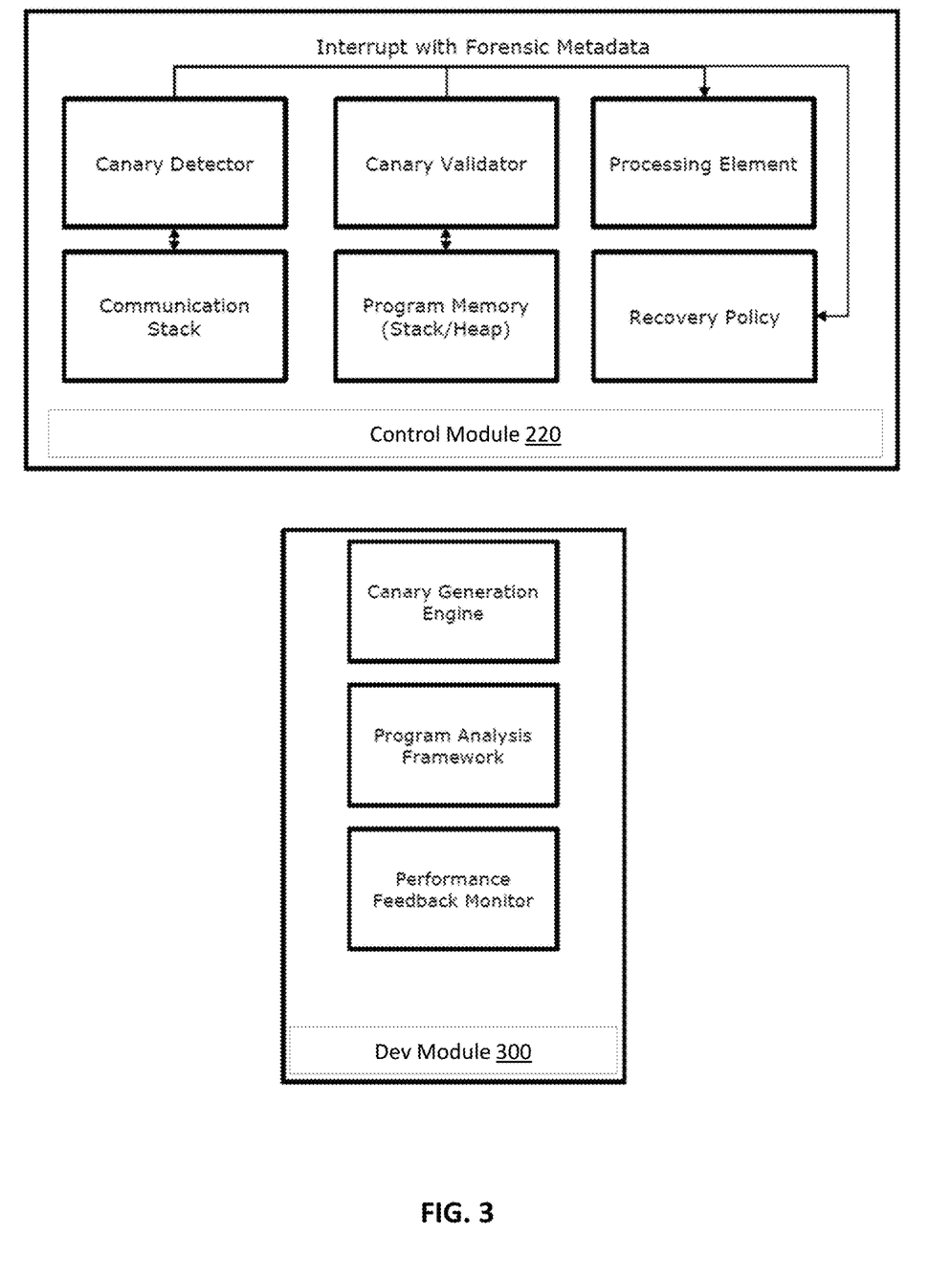
FIG. 3 illustrates one example of sub-modules of the security system.

As an additional explanation, consider FIG. 3, which illustrates further functions of the control module 220 and also functions associated with a dev module 300. The dev module 300 may be a subcomponent of the control module 220 or may reside on a separate system that is distinct from the security system 170. In any case, the dev module 300 comprises a canary generation engine, a program analysis framework, and a performance feedback monitor. Broadly speaking, the components of the dev module 300 support implementation of the program and functions of the security system 170. For example, the program analysis framework performs functional safety risk analysis on the program in order to identify functions of the program that influence the functional safety of the vehicle 100 and an extent of the influence. In one or more configurations, the program analysis framework may include a machine-learning algorithm that performs the functional risk analysis and/or further analysis to determine vulnerabilities and locations for inserting the canary values. Accordingly, the dev module 300 can perform the analysis and save the information as metadata associated with the segments of the program. The metadata can be integrated with the program and/or provided as separate electronic information.

Moreover, the performance feedback monitor of the dev module 300 generally functions to monitor the program and/or the control module 220 in relation to compute resources consumed. In particular, the dev module 300 uses the monitor to track resources consumed in relation to the canary values. That is, because generating, inserting, and tracking the canary values consumes computing resources and may consume a greater number of resources depending on various factors, such as the canary length, a location of the insertion, and so on, developing knowledge about how to best leverage the canary values can be useful. For example, the dev module 300 and/or the control module 220 can track resource consumption in relation to different aspects of the program (e.g., a number of times a particular function is executed and a canary is checked) in order to provide further awareness about how to best provision the canary values within the program. Lastly, the dev module 300 includes a canary generation engine. The canary generation engine functions to, for example, create canary values. As will be discussed in greater detail subsequently, the canary generation engine may include a pseudo-random number generator (PRNG) that creates a random value having desired characteristics (e.g., length) according to a seed value.

For example, the control module 220, implementing the canary generation engine, determines where in the program to insert canary values. In one approach, as the program executes, the control module 220 monitors the execution state via the system state 240 and selectively generates and inserts the canary values into the program memory (i.e., between data elements, instructions, etc.). As one aspect, the control module 220 randomly generates the canary values for insertion into the program memory according to a timer implemented via an interrupt. The timer defines a regular interval at which the canary values are to be inserted or may instead be randomly initialized to provide irregular intervals. In still a further aspect, the control module 220 identifies characteristics of executing segments of the program and inserts the canary values according to the characteristics. Thus, the control module 220 may determine when a program segment (e.g., a function) is executing with a particular security level (e.g., above a defined threshold value) and generate and insert the canary value. In further aspects, the program may be annotated by a developer to identify vulnerable functions that cue the control module 220 to generate the canary value.

Generating the canary value first includes determining a type of the canary value. For example, according to the security level of the segment, the control module 220 determines a length of the canary value. In various configurations, the available lengths may differ (e.g., 64 bit, 128 bit, 256 bit, etc.). It should be appreciated that the greater the length of the canary value, the greater the computational resources to generate and subsequently validate/check the canary value. As such, longer and more secure canary values may be used less frequently to reduce the computational burden of implementing the canaries, while shorter canary values may be used more frequently to protect a greater number of program segments. In any case, the control module 220 seeds the PRNG using random values from, for example, a current steering angle, values of physical sensors in the vehicle 100, system-on-a-chip (SoC) thermal values, clock drift values, and so on. As a result, the canary value is generated pseudo-randomly and is then inserted into the program segment, which may include updating various memory offsets in order to maintain functionally equivalent program flow.

Continuing with the control module 220, as shown in FIG. 3, the control module is shown as including a canary detector, a canary validator, a processing element (e.g., processor 110), and a recovery policy. The canary detector, in one or more arrangements, functions to identify canary values in the program as the program executes and/or to identify canary values at system interfaces of the program, such as within a communication stack, as shown in FIG. 3. The communication stack generally defines a protocol for communicating between one system and another, such as between various systems in the vehicle 100 and/or with remote devices. Thus, the communication stack, as referenced herein, includes routines that implement the protocol. As such, the control module 220 can, in at least one arrangement, sniff or otherwise observe communications from the communications stack that are traversing out of the system to identify when the canary values are present, and, thus, when the memory of the program is being offloaded, which is generally indicative of a malicious actor breaching the system.

The canary validator of the control module 220 functions to validate (i.e., check) canary values that are identified within the program memory. The program memory is, in various arrangements, a stack, a heap, or another data structure that organizes the data elements and instructions of the program. Accordingly, as the program executes, the control module 220 can identify the canary values within the program and compare the canary values against stored values. That is, the control module 220 maintains a database of canary values and, for example, associated memory locations. As such, when the processor 110 executes the program and arrives at a known location of a canary value according to the database, the control module 220 then compares the canary value that is stored in the memory with a value of the canary from the database. Thus, the control module monitors for canary integrity, in one approach, by counting the number of canaries that appear in the address space of a process, which may occur asynchronously, periodically, based on program branches, or triggered by context switches.

In a further aspect, the control module 220 performs a direct comparison of values. That is, when the two values match (i.e., the stored canary value versus the observed canary value), then the canary value is validated, and the program proceeds with execution. However, when the values do not match, then a mitigation action may be implemented according to a recovery policy. For example, in one approach, the processor 110 or another associated device on which the program is executed may be disabled until a defined input (e.g., a pin or a particular input sequence) is received. Of course, in further approaches, the control module 220 may employ other mitigation actions, such as deleting sections of memory, restoring sections of memory, permanently disabling the program and device, and so on.

Figure 4:
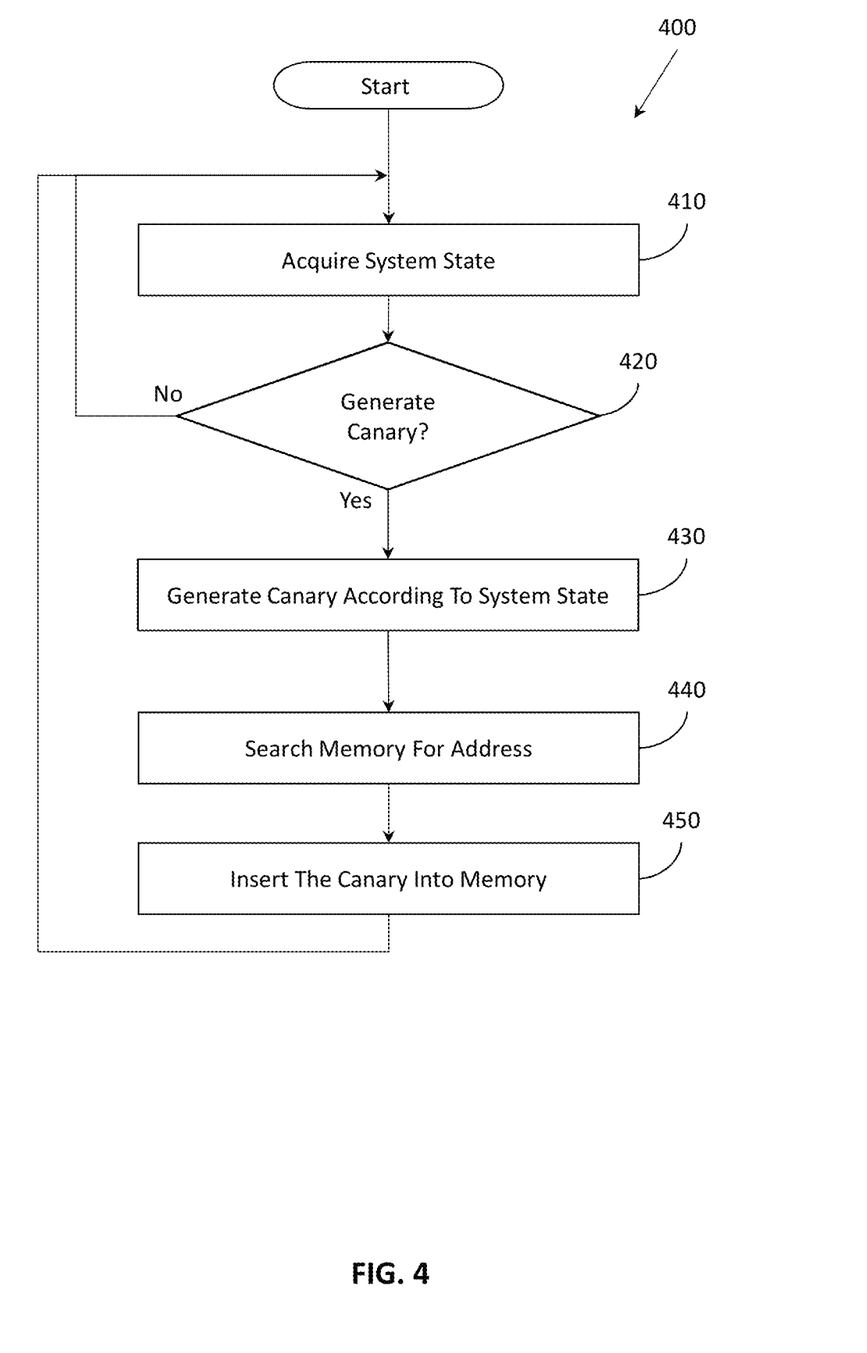
FIG. 4 illustrates one embodiment of a method associated with adaptable canary values.

Additional aspects of securing a program against malicious attacks using adaptable canary values will be discussed in relation to FIG. 4. FIG. 4 illustrates a method 400 associated with implementing adaptable canary values. Method 400 will be discussed from the perspective of the security system 170 of FIG. 1. While method 400 is discussed in combination with the security system 170, it should be appreciated that the method 400 is not limited to being implemented within the security system 170 but is instead one example of a system that may implement the method 400.

At 410, the control module 220 acquires the system state 240. In at least one configuration, acquiring the system state 240 includes multiple separate aspects. That is, the control module 220 acquires at least a portion of the system state 240 by monitoring execution of the program to provide awareness of the current execution location within the program (i.e., which segment is executing, which memory location is presently being accessed, etc.). The information about the execution, also referred to as the execution context, can indicate which segment of the program is currently executing, a state of the program, and so on. Moreover, the system state 240 further includes determinations from prior to runtime that may be correlated with the segments using metadata. The determinations include, in at least one approach, functional risk analysis data identifying which segments correspond to functional safety risks, developer annotations providing manual indications of security levels for the segments. Outputs from a machine-learned model trained to identify software weaknesses, and so on. As previously noted, the security level for a respective program segment is based, at least in part, on a risk or vulnerability associated with the segment as defined by the noted elements of the system state 240.

At 420, the control module 220 determines whether the system state 240 satisfies a generating threshold that indicates when a canary value should be generated. In one arrangement, the generating threshold indicates security levels associated with program segments at which a canary value is to be generated. In a further aspect, the generating threshold is a timer that may operate according to randomly seeded values or according to a regular interval and upon expiration, thereby satisfying the generating threshold. The expiration of the timer, in one approach, generates an interrupt that causes the control module 220 to proceed with generating a canary value according to the characteristics of the current segment at which the program is executing. In a further aspect still, the control module 220 determines that the generating threshold is satisfied according to a location in the program identified via a mapping that indicates the memory address at which to generate the canary value. This triggering mechanism can be associated with attaining a critical point in the program, such as at a function transition point. In any case, multiple different sources of information can inform when to generate the canary value.

At 430, the control module 220 generates a canary value according to the system state 240. In one arrangement, the control module 220 selects a length of the canary value according to the security level for a respective segment of the program for which the canary is being generated. Thus, as previously noted, the canary value can have different lengths (e.g., 64, 128 bits, etc.) depending on a level of security desired for the specific segment of the program. Furthermore, as described, the control module 220 implements a pseudo-random number generator (PRNG) to generate the canary value. In various aspects, the control module 220 controls the PRNG to generate the canary value having a particular length and also seeds the PRNG with a random variable acquired from some source associated with the vehicle 100. For example, the control module 220 may sample values associated with driver inputs (e.g., degree of steering wheel turn, brake input, etc.), SoC thermal values or clock drift, physical sensor readings, and so on. The listed values should not be interpreted as limiting but as merely an example of values that the control module 220 may use as a seed. Moreover, the seed values may further be modified and/or combined in order to ensure an appropriate input to the PRNG. The control module 220 may store the canary values generated for a respective segment of the program, for example, in a memory cache device, so as to accelerate searches, comparisons, and other subsequent steps performed by the system.

At 440, the control module 220 searches the memory for a location associated with the current point of execution at which the canary value is to be inserted. For example, the control module 220, in one approach, pauses the execution of the program and searches the memory in which the program is stored, e.g., memory 210 or a memory associated with another component within the vehicle 100. In any case, the control module 220 identifies the memory address for the canary value so that the canary can be copied appropriately.

At 450, the control module 220 inserts the canary value into the memory address identified at 440. In one approach, the control module 220, as noted previously, pauses execution of the program, and rewrites a respective segment of the program associated with the canary value. Because inserting the canary value into a memory address between elements of the program intrinsically shifts subsequent elements to different address locations, the control module 220 shifts the segment as needed to accommodate the canary value and also update offsets of the program (e.g., branch locations, etc.) to accommodate the canary value and ensure the program continues to function without faults. By inserting the canary value into various locations, including by deconstructing data objects and integrating the canary values within functions, the control module 220 provides a mechanism to prevent non-control flow attacks and thereby improves the security of the program overall. Once the canary value is inserted, and the offsets are updated, the program can then be unpaused and permitted to continue with execution.

Figure 5:
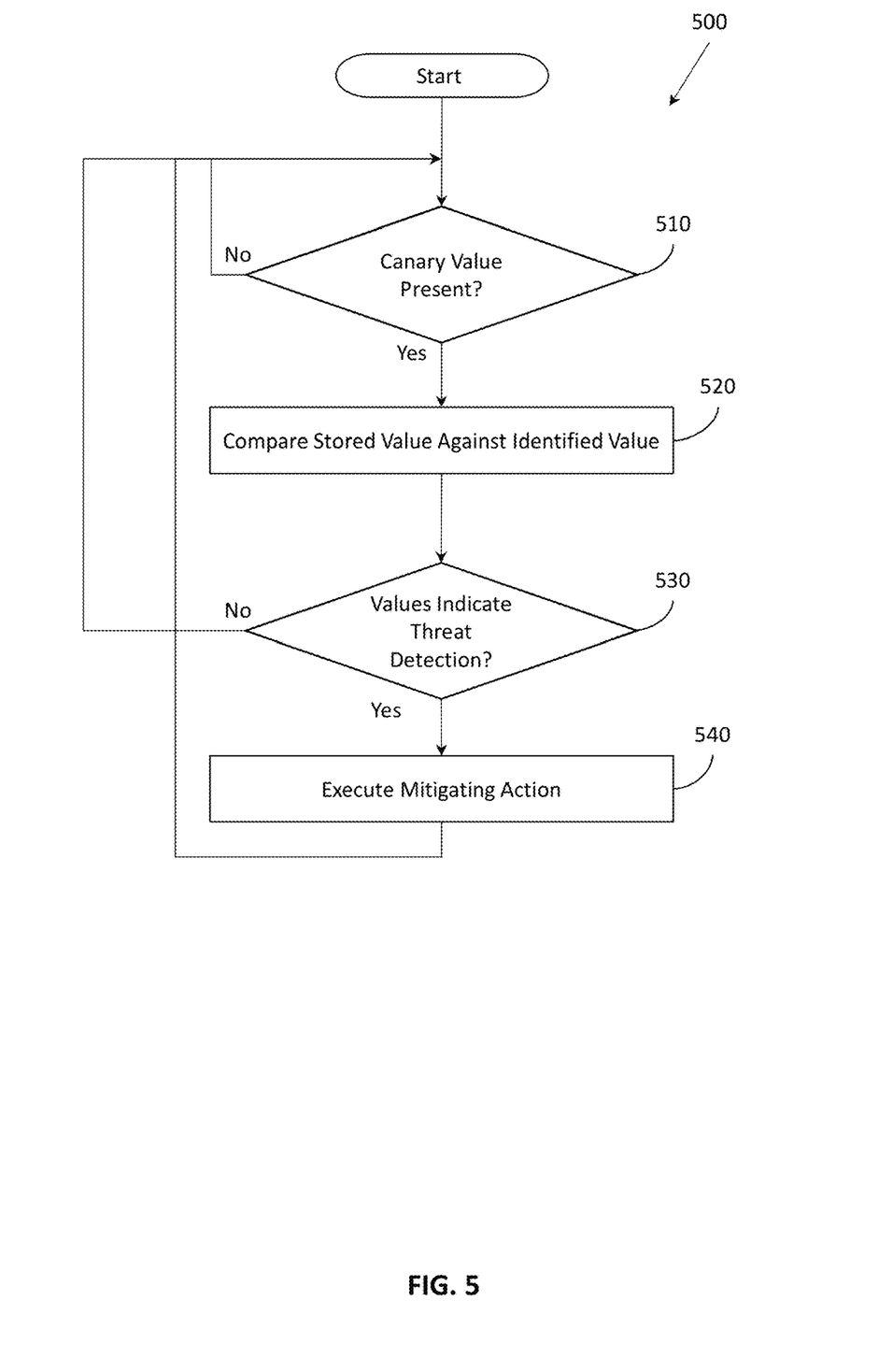
FIG. 5 illustrates one example of a method associated with monitoring canary values within a program.

As a further explanation of how the presently disclosed systems and methods function, consider FIG. 5. FIG. 5 illustrates a method 500 associated with monitoring canary values within a program. Method 500 will be discussed from the perspective of the security system 170 of FIG. 1. While method 500 is discussed in combination with the security system 170, it should be appreciated that the method 500 is not limited to being implemented within the security system 170 but is instead one example of a system that may implement the method 500.

At 510, the control module 220 monitors for the canary value according to an execution state of the program, including program branches, context switches and patterns of access to segments of memory, as previously noted. For example, the control module 220 monitors a current address space in which the program is executing to identify the presence of canary values. In one approach, the control module 220 uses a database or another listing of canary values that indicates memory locations for the canary values. Thus, when a memory address that is in use by the processor 110 corresponds to a known location, the control module 220 proceeds with further examining the canary value. Additionally, the control module 220 may also monitor various interfaces of the system to identify when information in the memory is potentially being offloaded. For example, the control module 220 may monitor a memory interface, a network interface, a system bus, or another point within the system in order to identify when information is being offloaded from the memory. Accordingly, when the control module 220 identifies what appears to be a canary value on one of the interfaces, then the system may proceed with comparing the observed and the stored original value in order to validate the presence of the value.

At 520, the control module 220 compares the canary value from the memory address with a stored canary to determine whether the canary value has been altered. For example, the control module 220 identifies a corresponding value to the observed value via a lookup in the noted database or another data structure to retrieve the original value associated with a memory address of the program. Accordingly, the control module 220 can then directly compare the observed value and the original value to determine correspondence.

At 530, the control module 220 determines whether the comparison indicates the presence of a threat, such as a malicious attack that is attempting to alter the memory and/or to offload contents of the memory from the system. For example, in the case of detecting a canary value at an interface, a match indicates that the contents of the memory are being offloaded, which is undesirable as it exposes the program to reverse engineering or further analysis by a malicious actor. In the case of a mismatch between a canary value in the memory versus the database, a mismatch indicates that the memory has been altered, which is generally a sign of malicious manipulation of the program memory. Moreover, the determination of altered memory contents at 530 may trigger the control module 220 to check other segments of memory associated with the program segment. Accordingly, when the comparison indicates the detection of a threat, the system may proceed to block 540. Otherwise, the system continues to monitor by returning to 510.

At 540, the control module 220 executes a mitigating action. In one approach, the mitigating action is executed according to the previously noted recovery policy. The recovery policy may define multiple different actions that can be undertaken depending on the threat that is detected. For example, in at least one arrangement, a machine-learning algorithm may process the information about the attack to classify the attack and then inform the response that is to be taken. In another arrangement, a decision tree, for example, based on the functional safety pre-analysis, may similarly process the information to determine the mitigating action. As one example, in the case of offloading memory, the control module 220 may shut down the system and deny further access until a defined secured input (e.g., a security code) is provided as input. In further aspects, the control module may delete the memory, restore the memory, log the event, transmit a communication alerting about the event, and so on. In any case, the control module 220 acts to mitigate or otherwise thwart malicious attempts to modify or read the program memory.

Figure 6:
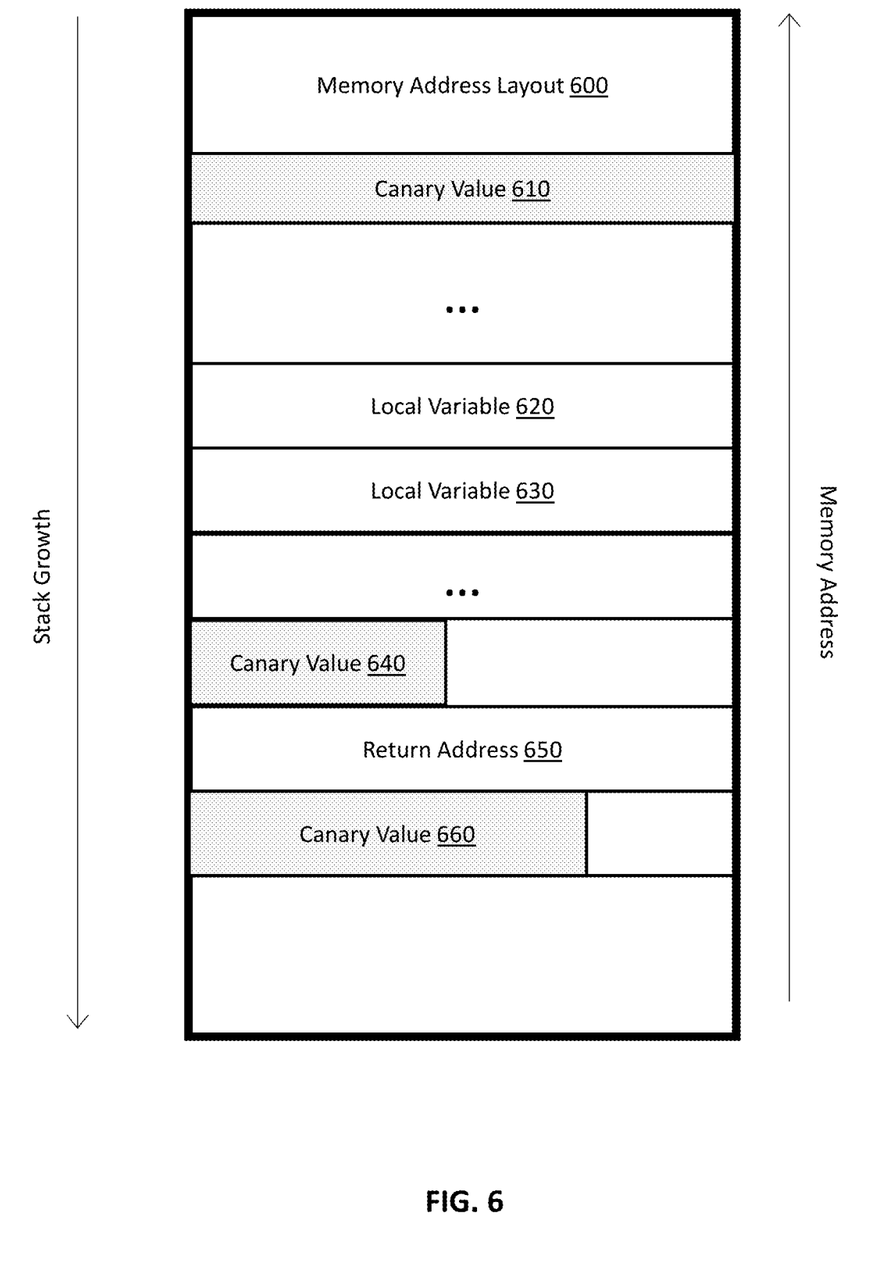
FIG. 6 illustrates one example of a memory address layout associated with a program that includes canary values.
Figure 7:
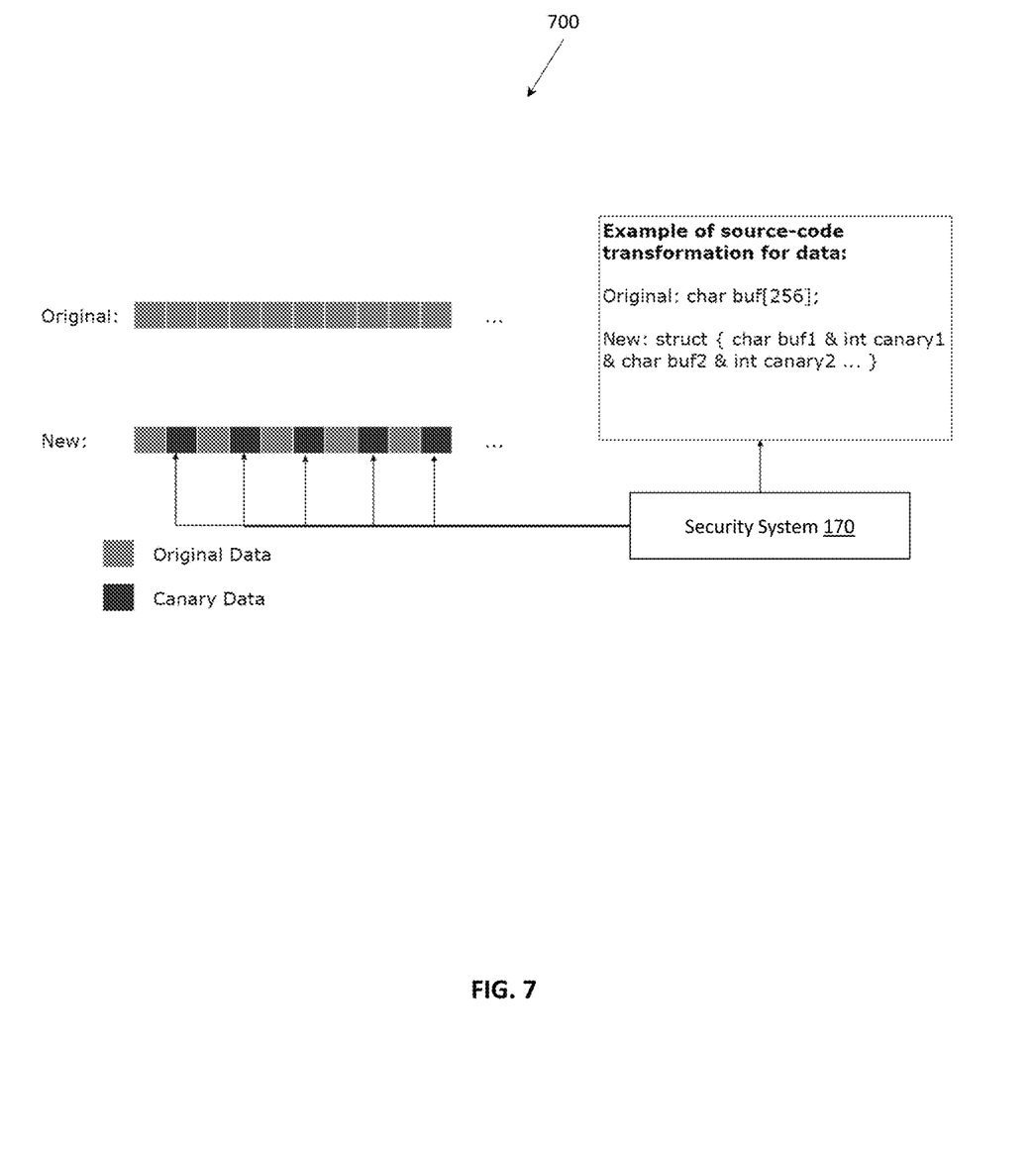
FIG. 7 illustrates one example of a canary values integrated with a program.

As a further explanation of how the canary values are inserted into the program and protect against malicious attacks, briefly consider FIGS. 6-7. FIG. 6 illustrates a memory address layout 600 of the contents of memory, including one program. As shown, the layout 600 illustrates a canary value 610, local variables 620 and 630, a canary value 640, a return address 650, and a canary value 660. As shown, the canary values 610, 640, and 660 are all of different lengths and are also associated with different areas or segments of the program within the layout 600. For example, canary values 640 and 660 are proximate to a return address 650, which represents a branch location of a function. Thus, canary value 640 is within the function, whereas canary value 660 is not. In any case, the layout 600 generally illustrates how the canary values 610, 640, and 660 and interspersed between data structures and instructions of the program stored in memory.

FIG. 7 illustrates data 700 of a program before and after being instrumented with canary values. As shown, FIG. 7 highlights source code in an original format and a new format after having been instrumented by the security system 170. As seen in the source code, the original char buf is a continuous data structure of length 256 bits. However, after being instrumented with canary values, the new struct oscillates between canary values and the original buffer data. This instrumentation is also represented visually to highlight how the data structure is decomposed and reformed with the canary values interspersed therein. In this way, the security system 170 can improve the protection of the program against malicious attack.

Additionally, it should be appreciated that the security system 170 from FIG. 1 can be configured in various arrangements with separate integrated circuits and/or electronic chips. In such embodiments, the control module 220 is embodied as a separate integrated circuit. The circuits are communicably coupled via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the security system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps.

The one or more data stores 115 can include sensor data. In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment, such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the security system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the security system 170, and/or the assistance system 160 may control some or all of these vehicle systems 150 and, thus, may be partially or fully autonomous.

The processor(s) 110, the security system 170, and/or the assistance system 160 can be operatively connected to communicate with the various vehicle systems 150 and/or individual components thereof. For example, returning to FIG. 1, the processor(s) 110, the security system 170, and/or the assistance system 160 can be in communication to send and/or receive information from the various vehicle systems 150 to control the movement, speed, maneuvering, heading, direction, etc. of the vehicle 100. The processor(s) 110, the security system 170, and/or the assistance system 160 may control some or all of these vehicle systems 150.

The processor(s) 110, the security system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the security system 170, and/or the assistance system 160 can control the direction and/or speed of the vehicle 100. The processor(s) 110, the security system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the security system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160 either independently or in combination with the security system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the system state 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having." as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A security system, comprising:
one or more processors; and
a memory communicably coupled to the one or more processors and storing:
a control module including instructions that, when executed by the one or more processors cause the one or more processors to:
acquire state information about a program executing within a vehicle, wherein the state information specifies at least a security level of segments of the program;
responsive to the program satisfying a generating threshold which includes monitoring for when the program is executing at a location of a canary value as identified via a mapping that indicates a memory address and for a timing interrupt occurring for generating the canary value, generate the canary value according to the state information, the instructions including instructions to select a length of the canary value according to the security level for a respective segment of the segments of the program; and
insert the canary value into the memory address associated with the program, wherein the security system is integrated with the vehicle, and wherein the security level is based, at least in part, on at least one of a risk associated with the respective segment and functional safety associated with the respective segment identified from a pre-analysis of the program.

2. The security system of claim 1, wherein the canary value is not encrypted.

3. The security system of claim 1, wherein the control module includes the instructions to insert the canary value including instructions to pause execution of the program, search the memory of the vehicle for the memory address associated with the canary value, and rewrite the respective segment of the segments associated with the canary value to shift the respective segment and update offsets of the program to accommodate the canary value, and wherein the control module includes the instructions to insert the canary value into the program as a mechanism to prevent non-control flow attacks.

4. The security system of claim 1, wherein the control module includes the instructions to insert the canary value including instructions to integrate the canary value into the program at a transition point of a function in the program, or to deconstruct a data object of the program to integrate the canary value within the data object, including a function of the program, and wherein the control module includes the instructions to insert the canary value including instructions to interleave the canary value within instructions of the program.

5. The security system of claim 1, wherein the control module includes the instructions to monitor for the canary value according to an execution state of the program including instructions to compare the canary value from the memory address with a stored canary to determine whether the canary value has been altered.

6. The security system of claim 5, wherein the control module includes the instructions to monitor for the canary value including instructions to check a system interface associated with the memory in which the program is stored for communications offloading the program.

7. The security system of claim 1, wherein the vehicle is an autonomous vehicle.

8. A non-transitory computer-readable medium storing instructions that, when executed by one or more processors, cause the one or more processors to:
acquire state information about a program executing within a vehicle, wherein the state information specifies at least a security level of segments of the program;
responsive to the program satisfying a generating threshold which includes monitoring for when the program is executing at a location of a canary value as identified via a mapping that indicates a memory address and a timing interrupt occurring for generating the canary value, generate the canary value according to the state information, the instructions including instructions to select a length of the canary value according to the security level for a respective segment of the segments of the program; and
insert the canary value into the memory address associated with the program, wherein the one or more processors are integrated with the vehicle, and wherein the security level is based, at least in part, on at least one of a risk associated with the respective segment and functional safety associated with the respective segment identified from a pre-analysis of the program.

9. The non-transitory computer-readable medium of claim 8, wherein the canary value is not encrypted.

10. The non-transitory computer-readable medium of claim 8, wherein the instructions include instructions to insert the canary value including instructions to pause execution of the program, search memory of the vehicle for the memory address associated with the canary value, and rewrite the respective segment of the segments associated with the canary value to shift the respective segment and update offsets of the program to accommodate the canary value, and wherein the instructions include instructions to insert the canary value into the program as a mechanism to prevent non-control flow attacks.

11. The non-transitory computer-readable medium of claim 8, wherein the instructions include instructions to insert the canary value including instructions to integrate the canary value into the program at a transition point of a function in the program, or to deconstruct a data object of the program to integrate the canary value within the data object, including a function of the program, and
wherein the instructions to insert the canary value including instructions to interleave the canary value within instructions of the program.

12. A method, comprising:
acquiring state information about a program executing within a vehicle, wherein the state information specifies at least a security level of segments of the program;
responsive to the program satisfying a generating threshold which includes monitoring for when the program is executing at a location of a canary value as identified via a mapping that indicates a memory address and a timing interrupt occurring for generating the canary value, generating the canary value according to the state information, including selecting a length of the canary value according to the security level for a respective segment of the segments of the program; and
inserting the canary value into the memory address associated with the program, wherein the method is executed by one or more processors, wherein the one or more processors are integrated with the vehicle, and wherein the security level is based, at least in part, on at least one of a risk associated with the respective segment and functional safety associated with the respective segment identified from a pre-analysis of the program.

13. The method of claim 12, wherein the canary value is not encrypted.

14. The method of claim 12, wherein satisfying the generating threshold includes at least one of executing the program at a location of the canary value as identified via a mapping that indicates the memory address and encountering a timing interrupt for generating the canary value.

15. The method of claim 12, wherein inserting the canary value includes pausing execution of the program, searching memory of the vehicle for the memory address associated with the canary value, and rewriting the respective segment of the segments associated with the canary value to shift the respective segment and update offsets of the program to accommodate the canary value, and wherein inserting the canary value into the program provides a mechanism to prevent non-control flow attacks.

16. The method of claim 12, wherein inserting the canary value includes integrating the canary value into the program at a transition point of a function in the program, or deconstructing a data object of the program to integrate the canary value within the data object, including a function of the program,
wherein inserting the canary value includes interleaving the canary value within instructions of the program.

17. The method of claim 12, further comprising:
monitoring for the canary value according to an execution state of the program by comparing the canary value from the memory address with a stored canary to determine whether the canary value has been altered.

18. The method of claim 17, wherein monitoring for the canary value includes checking a system interface associated with memory in which the program is stored for communications offloading the program.

* * * * *